United States Patent [19]

Yu et al.

[11] 4,148,842
[45] Apr. 10, 1979

[54] BLENDS OF A POLYCARBONATE RESIN AND INTERPOLYMER MODIFIER

[75] Inventors: Arthur J. Yu, Stamford, Conn.; Joseph Silberberg, Brooklyn, N.Y.

[73] Assignee: Stauffer Chemical Company, Westport, Conn.

[21] Appl. No.: 915,704

[22] Filed: Jun. 15, 1978

[51] Int. Cl.$^2$ .............................................. C08L 69/00
[52] U.S. Cl. .................................. 260/873; 260/860; 260/881; 260/884; 260/885; 260/886
[58] Field of Search ........................ 260/860, 873, 881

[56] References Cited

U.S. PATENT DOCUMENTS

| 3,130,177 | 4/1964 | Grabowski | 260/45.5 |
| 3,239,582 | 3/1966 | Keskkula et al. | 260/873 |
| 3,345,434 | 10/1967 | Griffith | 260/901 |
| 3,655,826 | 4/1972 | Fillmann et al. | 260/876 R |
| 3,843,390 | 10/1974 | Hudson et al. | 260/873 X |
| 3,896,185 | 7/1975 | Yonemitsu et al. | 260/873 |
| 3,944,631 | 3/1976 | Yu et al. | 260/881 |
| 3,957,921 | 5/1976 | Iwahashi et al. | 260/901 |

FOREIGN PATENT DOCUMENTS 5294349  1977  Japan.

OTHER PUBLICATIONS

Plastics World, Nov. 1977, pp. 56–58.

*Primary Examiner*—Thomas DeBenedictis
*Attorney, Agent, or Firm*—Richard P. Fennelly

[57] ABSTRACT

Blends of a polycarbonate resin and an interpolymer modifier comprising crosslinked (meth)acrylate, crosslinked styrene-acrylonitrile, and uncrosslinked styrene-acrylonitrile polymeric components are disclosed. The blends have improved processing as compared to the processing characteristics of the polycarbonate resin alone and are impact resistant. They are more weather resistant than blends of the polycarbonate resin and ABS graft copolymers.

6 Claims, No Drawings

1
BLENDS OF A POLYCARBONATE RESIN AND INTERPOLYMER MODIFIER

BACKGROUND OF THE INVENTION

1. Field of the Invention

The present invention relates to blends of a polycarbonate resin and an interpolymer modifier, said blends having good processing characteristics, impact resistance and weatherability. The resulting blends are useful in the production of weatherable, impact resistant molded and shaped articles.

2. Description of the Prior Art

Polycarbonate resins are tough, rigid engineering thermoplastics having good impact strength. They, however, have low flow characteristics which sometimes causes difficulties in processing. Various prior art attempts have been made to blend polycarbonate resins with other polymeric modifiers to solve this problem while still retaining the toughness and impact resistance of the polycarbonate resin.

Acrylonitrile-butadiene-styrene (ABS) graft copolymers have been blended with polycarbonate resins to yield a lower cost blend having improved processing characteristics while retaining good impact resistance (see U.S. Pat. No. 3,130,177 to T. S. Grabowski, and Plastics World, November 1977, pp. 56–58). The impact resistance of such blends, however, tends to deteriorate after the material has been exposed to such environmental factors as sunlight.

Blends of polycarbonate resin and acrylic/styrene polymers are also known (U.S. Pat. No. 3,655,826 to R. P. Fellmann et al. and Japanese Patent Document No. 52-94349).

SUMMARY OF THE PRESENT INVENTION

The present invention relates to weatherable, impact resistant blends of: (1) a polycarbonate resin; and (2) an interpolymer modifier comprising crosslinked (meth)acrylate, crosslinked styrene-acrylonitrile, and uncrosslinked styrene-acrylonitrile polymeric components, said blends having improved processability as compared to polycarbonate resin alone. The particular type of interpolymer used as one component in the blends of the present invention is responsible for this improvement in their processing characteristics while conferring a greater degree of weather resistance on the blends (as compared to conventional ABS resin additives) and also maintaining acceptable, even superior, impact resistance for the blends (as compared to the use of conventional acrylic/styrene containing polymers).

DESCRIPTION OF PREFERRED EMBODIMENTS

The blends of the present invention comprise: (1) a polycarbonate resin; and (2) an interpolymer modifier comprising crosslinked (meth)acrylate, crosslinked styrene-acrylonitrile, and uncrosslinked styrene-acrylonitrile polymeric components.

The term "polycarbonate resin", as used herein, is intended to encompass polycarbonate-type resins which are formed by the condensation polymerization of a dihydric phenol, such as a bis(hydroxyphenyl)alkane, and a carbonate precursor, such as a carbonyl halide, as major monomeric reactants. Details regarding the structure of these materials and the processes for forming them are available from a number of sources including "Polycarbonates", Kirk-Othmer Encyclopedia of Chemical Technology, Second Edition, Vol. 16, pp. 106–115, John Wiley and Sons, Inc. 1968, which is incorporated herein by reference. If desired, the monomeric reaction medium used to form such polycarbonate-type resins can contain other monomeric reactants that do not adversely affect the basic characteristics of the polycarbonate resin. Representative examples of possible additional monomeric reactants include: reactive flame retardant monomers, chain branching monomers, chain transfer agents, and the like. Some recently issued patents which describe some of the various types of reactants that may be used to form these polycarbonate resins include: U.S. Pat. Nos. 3,766,139 and 3,931,108; and U.S. Pat. No. Re. 27,682.

The terminology "interpolymer modifier comprising crosslinked (meth)acrylate, crosslinked styrene-acrylonitrile, uncrosslinked styrene acrylonitrile components" is meant to encompass the type of interpolymer compositions described in U.S. Pat. No. 3,944,631 to A. J. Yu et al. These interpolymer compositions are formed by the following type of three-step, sequential polymerization process:

1. emulsion polymerizing a monomer charge (herein designated "(meth)acrylate", for purposes of the present invention), of at least one $C_2$–$C_{10}$ alkyl acrylate, $C_8$–$C_{22}$ alkyl methacrylate, or compatible mixtures thereof, in an aqueous polymerization medium in the presence of an effective amount of a suitable di- or polyethylenically unsaturated crosslinking agent for such a type of monomer, with the $C_4$–$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethylenically unsaturated crosslinking agent for such monomers, said polymerization being carried out in the presence of the product from Step 1 so that the crosslinked (meth)acrylate and crosslinked styrene-acrylonitrile components form an interpolymer wherein the respective phases surround and penetrate one another; and 3. either emulsion or suspension polymerizing a monomer charge of styrene and acrylonitrile, in the absence of a crosslinking agent, in the presence of the product resulting from Step 2. If desired, Steps 1 and 2 can be reversed in the above described procedure.

This product, which is used as the interpolymer modifier in the blends of the present invention generally comprises from about 5% to about 50%, by weight, of at least one of the above-identified crosslinked (meth)acrylates, from about 5% to about 35%, by weight, of the crosslinked styrene-acrylonitrile component and from about 15% to about 90%, by weight, of the uncrosslinked styrene-acrylonitrile component. It contains little graft polymerization between the styrene-acrylonitrile copolymer components and the crosslinked (meth)acrylate polymeric component. Further details regarding this type of polymer composition can be found in U.S. Pat. No. 3,944,631 to A. J. Yu et al., which is incorporated herein by reference.

Blending of the aforementioned polycarbonate resin and interpolymer modifier can be effected by any of the well-known polymer blending processes, such as two-roll or Banbury milling, single or multiple screw extrusion or any other method which applies sufficient heat and shear to the respective polymeric ingredients (polycarbonate resin and interpolymer modifier) to obtain a satisfactory blend in accordance with the present invention. Generally, blends with desirable properties can be obtained by blending the polymeric ingredients of the blend at temperatures of from about 176.7° C. to about 315.6° C., with the most preferable results being realized at from about 204.4° C. to about 287.8° C. because at lower blending temperatures there is the possibility of a lessening in the impact properties of the blend, while at higher temperatures there is the possibility that degradation of the interpolymer modifier may result. Blending at higher temperatures involves an additional expenditure of heat energy.

Useful, weatherable, processable blends of the polycarbonate resin and the above-described interpolymer modifier can be formulated in weight ratios of polycarbonate to interpolymer ranging from about 90:10 to about 5:95, preferably from about 70:30 to about 30:70, depending upon the types of physical properties desired in the final product. Such conventional processes as injection molding, extrusion, sheet extrusion followed by thermoforming, compression molding, and rotational molding can be used. If desired, final articles containing the blends of the present invention can be formed directly from powders of the polycarbonate and interpolymer, without prior blending, by either direct extrusion or injection molding of mixtures of such powders.

Generally, the use of lower amounts of modifier will yield a blend which has a greater degree of toughness and a higher heat deflection temperature. The use of higher amounts of the modifier will yield a more easily processable blend. It has been found that injection molded specimens of the blends containing low amounts of modifier will have greater impact resistance than specimens formed by compression molding. When compression molding is used, blends containing either high or low amounts of the modifier have a lessened impact resistance as compared to blends containing the polycarbonate and interpolymer modifier in a more equivalent amount, for example, from about 40:60 to about 60:40.

The following Examples illustrate certain preferred embodiments for the blends of the present invention and illustrate some of their properties.

EXAMPLE 1

This Example illustrates the process that was used to make the crosslinked acrylate/crosslinked styrene-acrylonitrile/uncrosslinked styrene-acrylonitrile interpolymer modifier of the type described in U.S. Pat. No. 3,944,631 to A. J. Yu et al. which was used in the blends described in Example 2.

The following ingredients were used in the three-step, all-emulsion, polymerization sequence:

| STEP 1 | |
|---|---|
| Ingredients | Amount (in gm.) |
| Butyl acrylate monomer | 5,334.5 |
| Butylene glycol diacrylate crosslinker | 12.8 |
| Deionized water | 41,172.1 |
| Ammonium persulfate initiator | 21.3 |
| Disodium isodecyl sulfosuccinate emulsifier (AEROSOL A-268 from American Cyanamid) - 50 wt. % solution | 85.3 |
| Sodium bicarbonate buffer | 21.3 |

| STEP 2 | |
|---|---|
| Ingredients | Amount (in gm.) |
| Styrene monomer | 1,414.1 |
| Acrylonitrile monomer | 523 |
| Divinyl benzene crosslinker (55 wt. % solution) | 7.76 |

| STEP 3 | |
|---|---|
| Ingredients | Amount (in gm.) |
| Styrene monomer | 1,916.17 |
| Acrylonitrile monomer | 716.3 |
| Sodium lauryl sulfate emulsifier (SIPEX UB from Alcolac, Inc.) -30 wt. % solution | 302.7 |
| Ammonium persulfate initiator | 24 |
| t-dodecyl mercaptan chain transfer agent | 29.1 |

| Post Treatment | |
|---|---|
| Ingredients | Amount (in gm.) |
| Butylated hydroxy toluene (0.2 wt. % solution) | 38.73 |
| Hindered phenolic oxidative/ thermal stabilizer (IRGANOX, from Ciba-Geigy Corp.) - 0.05 wt. % solution | 9.69 |

The following polymerization procedure was used:

Steps 1 and 2:

1. The butyl acrylate monomer and butylene glycol diacrylate crosslinking agent were premixed.

2. All the ingredients for Step 1 were then charged into a reactor equipped with a stirrer and were agitated at 90 to 100 rpm.

3. The reactor was evacuated for 5 min., and nitrogen gas was then charged into the reactor to break the vacuum so as to exclude oxygen from the reactor interior. This operation was repeated once.

4. The reaction mixture was then heated to 60° C., and this temperature was maintained until the solids content in the mixture had reached 11% by weight.

5. The reactor was then evacuated, and the styrene, acrylonitrile and divinyl benzene reactants for Step 2 were added. The pressure was returned to 0 kg./cm.² gauge.

6. The reaction mixture was maintained at 60° C. until the solids content had reached 14% by weight.

Step 3:

7. The reactor was again evacuated, and the ingredients for Step 3 were added. The pressure was returned to 0 kg./cm.² gauge.

8. The temperature was maintained at 60° C. until the solids content had reached 31%, by weight, which indicated substantial completion of the reaction.

9. The reaction mixture was then allowed to cool.

Post Treatment:

10. The post treatment ingredients were then added to terminate the reaction and stabilize the product against oxidative or thermal degradation and the mixture was stirred for 15 minutes.

11. The reaction mixture was filtered through a screen to separate reactor coagulum.

12. The latex from the filtering operation was then coagulated by addition of magnesium sulfate at a pH of 3.5 and the mixture was centrifuged and reslurried twice. The coagulated product was then dried.

EXAMPLE 2

This Example illustrates the general procedure that was used to make polycarbonate/interpolymer modifier blends for testing, with the modifier being made in accordance with Example 1.

The modifier from Example 1, and the polycarbonate resin (LEXAN 101, from General Electric Company) were both dried at 110° C. for several hours. Varying selected amounts of each were then mixed in pellet form and were extruded twice at 260° C. and 60 rpm in a single screw extruder having a 3.81 cm. diameter, and a length to diameter ratio of 20:1. The extrusion screw was a two-stage screw with a compression ratio of 2:1. Varying amounts were also injection molded at front zone temperatures ranging from 232° C. to 288° C., depending upon polycarbonate content.

Compression molding temperatures of appropriate test pieces ranged from 204° C. to 232° C., using 9072 kg. pressure to form 15.24 cm.×15.24 cm.×0.3175 cm. plaques.

The Table which follows shows the blends that were prepared and the physical properties which were obtained.

| Wt. % in Blend | | Izod Impact* (J/m) | |
|---|---|---|---|
| Modifier | Polycarbonate | Inj. Molded | Comp. Molded |
| 100 | 0 | 182 | 224 |
| 75 | 25 | 432 | 438 |
| 50 | 50 | 598 | 598 |
| 25 | 75 | 689 | 470 |
| 0 | 100 | 993 | 85 |

*ASTM-D256, Method A, 0.3175 cm. thick specimens. The abbreviation "J/m" stands for Joules/meter. Higher numbers are more desirable.

| Wt. % in Blend | | Tensile Yield Stress* (MPa) | Flex. Modulus** (GPa) | Heat Deflection Temp. Under Load** (° C.) |
|---|---|---|---|---|
| Modifier | Poly-carbonate | | | |
| 100 | 0 | 41.3 | 1.74 | 87 |
| 75 | 25 | 45.8 | 1.82 | 94 |
| 50 | 50 | 50.3 | 2.05 | 104 |
| 25 | 75 | 54.3 | 2.08 | 126 |
| 0 | 100 | 59.9 | 2.16 | 136 |

*for injection molded samples using ASTM-D638 with the modifications which follow. The specimens were 0.32 cm. × 0.32 cm. in cross-section with a gauge length of 1.42 cm. The abbreviation "MPa" stands for megapascals ($10^6$Pa). Higher numbers are more desirable.
**for compression molded pieces using ASTM-D790, Method I, Procedure A (specimen cross-section: 1.27 cm. × 0.32 cm., 5.08 cm. span) and ASTM D-648 (load 1.82 MPa; specimen thickness 0.32 cm.), respectively. The abbreviation "Gpa" stands for gigapascals ($10^9$Pa). Higher numbers are more desirable.

EXAMPLE 3

This Example illustrates the process used to prepare another interpolymer modifier of the type described in U.S. Pat. No. 3,944,631 to A. J. Yu et al. containing a lower rubber content than was present in the modifier of Example 1. This modifier was then used to form the blends described in Example 4.

The following ingredients were used in a three-step, all-emulsion, polymerization:

| STEP 1 | |
|---|---|
| Ingredients | Amount (in gm.) |
| Butyl acrylate monomer | 1,786 |
| Butylene glycol diacrylate crosslinker | 4.27 |
| Deionized water | 13,720 |
| Ammonium persulfate initiator | 7.1 |
| Disodium isodecyl sulfosuccinate emulsifier (AEROSOL A-268) - 50 wt. % solution | 28.4 |
| Sodium bicarbonate buffer | 7.1 |

| STEP 2 | |
|---|---|
| Ingredients | Amount (in gm.) |
| Styrene monomer | 471.4 |
| Acrylonitrile monomer | 174.3 |
| Divinyl benzene crosslinker (55 wt. % solution) | 2.59 |

| STEP 3 | |
|---|---|
| Ingredients | Amount (in gm.) |
| Styrene monomer | 11,255 |
| Acrylonitrile monomer | 4,167 |
| Deionized water | 24,239 |
| Sodium lauryl sulfate emulsifier (SIPEX UB) - 30 wt. % solution | 386 |
| Ammonium persulfate initiator | 30.6 |
| t-dodecyl mercaptan chain transfer agent | 37.1 |

| Post Treatment: | |
|---|---|
| Ingredients | Amount (in gm.) |
| Butylated hydroxy toluene (0.2 wt. % solution) | 35.8 |
| Hindered phenolic oxidative/ thermal stabilizer (IRGANOX) - 0.05 wt. % solution | 8.9 |

The following polymerization procedure was employed:

Steps 1 and 2, as described in Example 1, were used with a 18.92 liter reactor being employed.

The procedure for Step 3 was as follows:

1. The water, emulsifier and initiator for Step 3 were charged into a 75.7 liter reactor and the mixture was agitated at 90 to 100 rpm.

2. The product latex from Step 2 was added to this reactor along with the styrene and acrylonitrile.

3. The reactor was evacuated, and the vacuum was broken with nitrogen gas. This procedure was repeated once.

4. The pressure was returned to 0 psig, and the mixture was heated to 60° C.

5. The reaction was allowed to continue until a 32 wt. % solids content of product was reached.

6. The same post treatment procedure shown in Example 1 was used.

7. The product was coagulated using aluminum sulfate and was washed twice and dried as described in Example 1.

EXAMPLE 4

This Example reports the test results for various compositions, some of which contain the modifier of Example 3. The test procedures described in Example 2 were employed.

| Wt. % in Blend | | Izod Impact (J/m) | |
|---|---|---|---|
| Modifier | Polycarbonate | Inj. Molded | Comp. Molded |
| 100 | 0 | — | 21 |
| 50 | 50 | 502 | 288 |
| 0 | 100 | 993 | 85 |

| Wt. % in Blend | | Tensile at Yield (MPa) | Flex. Modulus (GPa) | Heat Deflection Temp. Under Load (° C.) |
|---|---|---|---|---|
| Modifier | Poly carbonate | | | |
| 100 | 0 | — | 2.59 | 94 |
| 50 | 50 | 59.2 | 2.34 | 103 |
| 0 | 100 | 59.9 | 2.16 | 136 |

EXAMPLE 5

This Example illustrates the mechanical properties for a series of blends of polycarbonate and various types of modifier additives.

Sample No. 1 is a blend of 60 wt. % polycarbonate resin and 40 wt. % of the modifier of Example 1.

Sample No. 2 is a blend of 60 wt. % polycarbonate and 40 wt. % of the modifier of Example 3.

Sample No. 3 is a commercially available blend of 60 weight % polycarbonate and 40 wt. % of an ABS resin additive. This is presented for comparative purposes.

| Sample No. | Tensile Yield Str. (MPa) | Flex. Modulus (GPa) |
|---|---|---|
| 1 | 51.9 | 2.16 |
| 2 | 61.5 | 2.45 |
| 3 (Comparative) | 58.9 | 2.45 |

| Sample No. | Heat Deflection Temp. Under Load (° C.) | Hardness (Barcol) |
|---|---|---|
| 1 | 102 | 70 |
| 2 | 107 | 77 |
| 3 (Comparative) | 108 | 76 |

| Sample No. | Izod Impact Notched (J/m) | Reversed Notch |
|---|---|---|
| 1 | 587 | 1,869 |
| 2 | 566 | 2,670 |
| 3 (Comparative) | 480 | 3,043 |

EXAMPLE 6

Specimens of the three types of samples shown in Example 5 were exposed, for varying lengths of time in an Xenon arc accelerated aging apparatus, and their impact values were tested on the exposed sides using the conventional notched and reversed notch Izod tests. The blends of the present invention (Sample Nos. 1 and 2) showed a superior retention of impact resistance compared to a conventional polycarbonate/ABS blend comparative (Sample No. 3).

| Sample No. | Notch Direction | Izod Impact Strength (J/m) | | |
|---|---|---|---|---|
| | | Initial | 25 hours | 100 hours |
| 1 | Forward | 587 | 609 | 603 |
| | Reverse | 1,879 | 1,795 | 1,281 |
| 2 | Forward | 566 | 582 | 555 |
| | Reverse | 2,678 | 2,947 | 2,434 |
| 3 (Comparative) | Forward | 480 | 395 | 315 |
| | Reverse | 3,032 | 1,281 | 598 |

| Sample No. | Notch Direction | 300 hours | 800 hours |
|---|---|---|---|
| 1 | Forward | 512 | 491 |
| | Reverse | 988 | 918 |
| 2 | Forward | 448 | 438 |
| | Reverse | 582 | 555 |
| 3 (Comparative) | Forward | 224 | 96* |
| | Reverse | 235 | 160* |

*brittle fracture occurred.

EXAMPLE 8

This Example illustrates the melt viscosity values for a series of materials. Lower numbers indicate a more easily processable material.

| Material | Melt Viscosity (poise at 1000 sec$^1$) |
|---|---|
| Polycarbonate (control) | 9200 |
| Yu et al. interpolymer modifier (from Example 1) (control) | 2630 |
| 60 wt. % polycarbonate/40 wt. % Yu et al. interpolymer modifier | 3300 |

A commercially available blend of 60 wt. % polycarbonate and 40 wt. % ABS has a melt viscosity of 3100 poise (at 1000 sec$^{-1}$) which is only slightly less than the melt viscosity of a 60:40 blend formed in accordance with the present invention.

The foregoing Examples illustrate certain preferred embodiments of the present invention and should not be construed in a limiting sense. The scope of protection that is sought is set forth in the claims which follow.

What is claimed is:

1. A weatherable, impact resistant blend comprising: (1) a polycarbonate resin; and (2) an interpolymer modifier comprising crosslinked (meth)acrylate, crosslinked styrene-acrylonitrile, and uncrosslinked styrene-acrylonitrile polymeric components.

2. A blend as claimed in claim 1 wherein the interpolymer comprises from about 5% to about 50%, by weight, of the (meth)acrylate component, from about 5% to about 35%, by weight, of the crosslinked styrene-acrylonitrile component, and from about 15% to about 90%, by weight, of the uncrosslinked styrene-acrylonitrile component.

3. A blend as claimed in claim 1 or 2 which comprises a weight ratio of polycarbonate to interpolymer of from about 90:10 to about 5:95.

4. A blend as claimed in either claim 1 or 2 wherein the weight ratio of polycarbonate to interpolymer is from about 70:30 to about 30:70.

5. A blend as claimed in either claim 1 or 2, wherein the (meth)acrylate component is selected from the group consisting of the crosslinked $C_2$-$C_{10}$ alkyl acrylates, the crosslinked $C_8$-$C_{22}$ alkyl methacrylates and compatible mixtures thereof.

6. A blend as claimed in either claim 1 or 2, wherein the (meth)acrylate component is a crosslinked $C_4$-$C_8$ alkyl acrylate.

* * * * *